United States Patent
Suda et al.

(10) Patent No.: US 7,883,815 B2
(45) Date of Patent: Feb. 8, 2011

(54) FUEL-STORING TANK FOR FUEL CELL

(75) Inventors: Yoshihisa Suda, Fujioka (JP); Kouji Nishimura, Fujioka (JP); Takahiro Osada, Fujioka (JP); Kunitaka Yamada, Fujioka (JP); Toshimi Kamitani, Fujioka (JP); Yasunari Kabasawa, Hamura (JP)

(73) Assignees: Mitsubishi Pencil Co., Ltd., Shinagawa-ku, Tokyo (JP); Casio Computer Co., Ltd., Shibuya-ku, Tokyo (JP)

( * ) Notice: Subject to any disclaimer, the term of this patent is extended or adjusted under 35 U.S.C. 154(b) by 943 days.

(21) Appl. No.: 11/629,410

(22) PCT Filed: Jun. 27, 2005

(86) PCT No.: PCT/JP2005/011733

§ 371 (c)(1),
(2), (4) Date: May 10, 2007

(87) PCT Pub. No.: WO2006/001419

PCT Pub. Date: Jan. 5, 2006

(65) Prior Publication Data

US 2007/0254198 A1    Nov. 1, 2007

(30) Foreign Application Priority Data

Jun. 25, 2004    (JP)    ............................. 2004-188177

(51) Int. Cl.
*H01M 8/04*    (2006.01)
(52) U.S. Cl. .................. 429/462; 429/454; 429/456; 429/512; 429/513

(58) Field of Classification Search .................. None
See application file for complete search history.

(56) References Cited

U.S. PATENT DOCUMENTS 5,364,711 A    11/1994    Yamada et al.

(Continued)

FOREIGN PATENT DOCUMENTS

EP    1 087 455 A2    3/2001

(Continued)

OTHER PUBLICATIONS

Supplementary European Search Report, European Application No. 05765151.5-1227/1770809, dated Jun. 24, 2008.

*Primary Examiner*—Jennifer K Michener
*Assistant Examiner*—Tony Chuo
(74) *Attorney, Agent, or Firm*—Buchanan Ingersoll & Rooney PC

(57) ABSTRACT

A fuel cell is equipped with a fuel cell main body, a liquid fuel-storing tank for storing a liquid fuel and a fuel-supplying member which has a penetrating structure and is connected with the liquid fuel-storing tank and which supplies the liquid fuel to the liquid fuel main body, wherein the liquid fuel-storing tank is provided with a liquid fuel reservoir comprising a cylindrical fuel-storing vessel for storing the liquid fuel, a fuel discharge part provided at a lower part of the fuel-storing vessel and having a fuel discharge valve and a follower which is disposed at a rear end of the liquid fuel stored in the fuel-storing vessel and which moves as the liquid fuel is consumed, a housing box member which encompasses at least a part of the liquid fuel reservoir via a space part in the periphery of the liquid fuel reservoir and whose rear end part is closed and pressurized gas which is filled in the space part.

16 Claims, 9 Drawing Sheets

U.S. PATENT DOCUMENTS

| | | | |
|---|---|---|---|
| 5,432,023 A | 7/1995 | Yamada et al. | |
| 6,506,513 B1 | 1/2003 | Yonetsu et al. | |
| 6,777,118 B2 | 8/2004 | Shioya | |
| 6,824,905 B2 | 11/2004 | Shioya et al. | |
| 6,916,565 B2 | 7/2005 | Shioya | |
| 7,169,367 B2 | 1/2007 | Takeyama et al. | |
| 2004/0096721 A1 | 5/2004 | Ohlsen et al. | |
| 2004/0126646 A1 | 7/2004 | Suda et al. | |
| 2005/0074643 A1* | 4/2005 | Adams et al. | 429/19 |
| 2005/0233189 A1 | 10/2005 | Shioya | |
| 2006/0006108 A1* | 1/2006 | Arias et al. | 210/232 |
| 2006/0151494 A1 | 7/2006 | Nakamura et al. | |
| 2006/0172171 A1 | 8/2006 | Deinzer et al. | |

FOREIGN PATENT DOCUMENTS

| | | |
|---|---|---|
| EP | 1 313 160 A1 | 5/2003 |
| JP | 59-066066 A | 4/1984 |
| JP | 05-258760 A | 10/1993 |
| JP | 05-307970 A | 11/1993 |
| JP | 6-188008 A | 7/1994 |
| JP | 2001-93551 A | 4/2001 |
| JP | 2001-102069 A | 4/2001 |
| JP | 2003-229158 A | 8/2003 |
| JP | 2003-299946 A | 10/2003 |
| JP | 2003-317755 A | 11/2003 |
| JP | 2003-340273 A | 12/2003 |
| JP | 2004-63200 A | 2/2004 |
| JP | 2004-247136 A | 9/2004 |
| JP | 2005-032598 A | 2/2005 |
| JP | 2005-38803 A | 2/2005 |
| JP | 2005-228663 A | 8/2005 |
| WO | WO 2004/051781 A2 | 6/2004 |

* cited by examiner

FUEL-STORING TANK FOR FUEL CELL

TECHNICAL FIELD

The present invention relates to a fuel cell, more specifically to a small-sized fuel cell suitably used as an electric power source for portable electronic appliances such as cellular phones, note type personal computers and PDA.

BACKGROUND ART

In general, a fuel cell comprises a cell on which an air electrode layer, an electrolyte layer and a fuel electrode layer are laminated, a fuel-supplying part for supplying fuel as a reducing agent to the fuel electrode layer and an air-supplying part for supplying air as an oxidizing agent to the air electrode layer, and it is an electric cell in which electrochemical reaction takes place in the cell of a fuel cell between fuel and oxygen in the air to provide electric power to the outside. Fuel cells of various types are developed.

In recent years, because of a rise in consciousness to environmental problems and energy saving, it is studied to use a fuel cell as a clean energy source for various applications. In particular, attentions have been paid to fuel cells which can generate electric power by only supplying directly a liquid fuel comprising methanol and water (refer to, for example, patent documents 1 and 2).

Among them, liquid fuel type fuel cells making use of capillary force for supplying a liquid fuel are known (refer to, for example, patent documents 3 to 7).

Liquid fuel type fuel cells described in the above respective patent documents supply a liquid fuel from a fuel tank to a fuel electrode by virtue of capillary force, and therefore they do not require a pump for sending a liquid fuel with pressure, so that they have merits in reducing a size.

Such liquid fuel type fuel cells as merely making use of capillary force of a porous body and/or a fiber bundle disposed in a fuel-storing tank are suited to reduction in a size in terms of constitution, but because fuel is supplied directly to a fuel electrode in the form of liquid, the fuel follows imperfectly during use over a long period of time under a use situation in which it is mounted in a small-sized portable appliances and in which the attitude of a cell part is changed very often in every direction, and the trouble that the fuel is cut off from being supplied is brought about, so that it causes inhibiting the fuel from being supplied constantly to an electrolyte layer.

On the other hand, known as one of countermeasures for solving the above defects is a fuel cell system in which a liquid fuel is introduced into a cell by virtue of capillary force and in which the liquid fuel is then vaporized in a fuel-vaporizing layer and used (refer to, for example, a patent document 8). However, it has the problem that poor followability of the fuel, which is a fundamental problem, is not improved, and involved therein is the problem that it is difficult to reduce a size of the fuel cell having the above structure because of a system in which a liquid is vaporized and then used as fuel.

As described above, in conventional fuel cells, the existing situation is that a liquid fuel is instably supplied in supplying the fuel directly to a fuel electrode to cause fluctuation in an output value during operation and that it is difficult to reduce a size thereof to such an extent that they can be mounted in portable appliances while maintaining stable characteristics.

When a conventional resin, for example, polyethylene is used as a material for a fuel tank, it is considered that a liquid fuel itself permeates the resin in storage over a long period of time or vaporization and leaking of the liquid fuel from joints of parts of a fuel tank take place, so that loss of the fuel is likely to be brought about. In this case, if the respective resinous members are constituted in such thicknesses that vaporization and leaking are not caused in order to prevent vaporization and leaking of the fuel, brought about is the problem that not only the purpose of reducing a size of the fuel cell main body can not be achieved but also it becomes difficult to observe a remaining amount of the liquid fuel. Further, when materials such as metal and glass are used for a material constituting a fuel tank, involved therein are the problems that if the material is made of metal, it is impossible to know a remaining amount of a liquid fuel and an amount of the fuel remaining in a fuel tank can not be observed and that if the material is made of glass, management in processing and assembling is troublesome to result in a rise in the cost and deformation and breakage are liable to take place.

Further, if a fuel cell having a fuel-storing tank and electronic appliances in which a fuel cell is mounted are left standing in a place where temperature is elevated in a certain case such as the vicinity of a front glass when fuel having a low boiling point such as methanol is used as a liquid fuel, the fuel having a low boiling point boils, so that all of it is vaporized and lost in a certain case. A method in which a substance for causing a rise in a boiling point is mixed with the liquid fuel is considered as a countermeasure for solving the above problems, but involved therein is the problem that if foreign matters are mixed in the liquid fuel, an adverse effect is exerted on electrode reaction in a certain case.

Also, a method in which the whole part of a fuel-storing tank is pressurized is considered as a method for raising an apparent boiling point of a liquid fuel. In this case, metals, glass and conventional resins are considered as a material constituting the fuel-storing tank which can endure the pressurization. As described above, however, involved therein are the respective problems that if the material is made of metal, it is impossible to observe a remaining amount of a liquid fuel; if the material is made of glass, management in processing and assembling is troublesome to result in a rise in the cost; and if the material is made of a resin, the liquid fuel and gas for pressurization are liable to vaporize or leak. Further, there is the problem that deformation and the like are liable to take place.

Further, known as a fuel cell in which pressurized gas is used as a supplying device for a liquid fuel is, for example, a fuel cell equipped with a vessel containing therein a liquid fuel and pressurized gas for pressurizing the liquid fuel to send to the fuel cell with pressure and a means for attach/detaching the vessel to and from a fuel-supplying passage for the fuel cell (refer to, for example, patent document 9).

However, in the above fuel cell in which a liquid fuel is supplied with pressurized gas, increase in a size of the device is brought about because the liquid fuel is controlled by means of a flow rate-controlling valve provided in a fuel-supplying passage, and a problem is still involved in mounting it on devices of a portable type. Further, the existing situation is that if the vessel is tilted from right to left or up and down, the liquid fuel can not be supplied well to exert an adverse effect on power generation efficiency.

Patent document 1: Japanese Patent Application Laid-Open No. 258760/1993 (claims, examples and others)

Patent document 2: Japanese Patent Application Laid-Open No. 307970/1993 (claims, examples and others)

Patent document 3: Japanese Patent Application Laid-Open No. 66066/1984 (claims, examples and others)

Patent document 4: Japanese Patent Application Laid-Open No. 188008/1994 (claims, examples and others)

Patent document 5: Japanese Patent Application Laid-Open No. 229158/2003 (claims, examples and others)

Patent document 6: Japanese Patent Application Laid-Open No. 299946/2003 (claims, examples and others)

Patent document 7: Japanese Patent Application Laid-Open No. 340273/2003 (claims, examples and others)

Patent document 8: Japanese Patent Application Laid-Open No. 102069/2001 (claims, examples and others)

Patent document 9: Japanese Patent Application Laid-Open No. 317755/2003 (claims, examples and others)

DISCLOSURE OF THE INVENTION

Problems to be Solved by the Invention

In light of the problems and the existing situation in the conventional fuel cells described above, the present invention has been made in order to solve them, and an object thereof is to provide a fuel cell in which a liquid fuel is stably supplied directly to a fuel electrode of a fuel cell main body and a use situation of the fuel can be visually observed with ease, in which loss of the liquid fuel is not caused in storing and the liquid fuel is less liable to boil and vaporize even when left standing under the environment of high temperature and which can be reduced in a size.

Means for Solving the Problems

Intensive studies on the conventional problems described above repeated by the present inventors have succeeded in obtaining a fuel cell which meets the object described above by assuming a structure of a fuel cell equipped with a fuel cell main body, a liquid fuel-storing tank for storing a liquid fuel and a fuel-supplying member which has a penetrating structure and is connected with the liquid fuel-storing tank and which supplies the liquid fuel to the liquid fuel main body, wherein the above liquid fuel-storing tank is provided with a liquid fuel reservoir comprising a cylindrical fuel-storing vessel for storing the liquid fuel, a fuel discharge part which is provided at a lower part of the fuel-storing vessel and which has a fuel discharge valve and a follower which is disposed at a rear end of the liquid fuel stored in the fuel-storing vessel and which moves as the liquid fuel is consumed, a housing box member which encompasses at least a part of the above liquid fuel reservoir via a space part in the periphery of the fuel reservoir and whose rear end part is closed and pressurized gas which is filled in the space part, and thus the present invention has come to be completed.

That is, the present invention comprises the following items (1) to (16).

(1) A fuel cell equipped with a fuel cell main body, a liquid fuel-storing tank for storing a liquid fuel and a fuel-supplying member which has a penetrating structure and is connected with the liquid fuel-storing tank and which supplies the liquid fuel to the liquid fuel main body, wherein the liquid fuel-storing tank is provided with a liquid fuel reservoir comprising a cylindrical fuel-storing vessel for storing the liquid fuel, a fuel discharge part which is provided at a lower part of the fuel-storing vessel and which has a fuel discharge valve and a follower which is disposed at a rear end of the liquid fuel stored in the fuel-storing vessel and which moves as the liquid fuel is consumed, a housing box member which encompasses at least a part of the liquid fuel reservoir via a space part in the periphery of the liquid fuel reservoir and whose rear end part is closed and pressurized gas which is filled in the space part.

(2) The fuel cell as described in the above item (1), further comprising a gas tube and a pressurizing means for pressurizing the above pressurized gas in the space part through the gas tube.

(3) The fuel cell as described in the above item (1) or (2), wherein the fuel-storing vessel and the housing box member each described above comprise a gas non-permeable material.

(4) The fuel cell as described in the above item (3), wherein a surface free energy of the fuel-storing vessel described above is controlled to a lower value than a surface free energy of the liquid fuel on at least a wall face which is brought into contact with the liquid fuel.

(5) The fuel cell as described in the above item (3) or (4), wherein the fuel-storing vessel and the housing box member each described above are formed of a material having a light transmittance of 50% or more.

(6) The fuel cell as described in any one of the above items (1) to (5), wherein the fuel-storing vessel and the housing box member each described above are formed of a material having an oxygen gas permeability of 100 cc·25 μm/m²·24 hr·atm (25° C., 65% RH) or less.

(7) The fuel cell as described in any one of the above items (3) to (6), wherein the gas non-permeable material described above comprises a gas non-permeable resin of a single kind or two or more kinds selected from polyvinyl alcohol, ethylene•vinyl alcohol copolymer resins, polyacrylonitrile, nylon, cellophane, polyethylene terephthalate, polycarbonate, polystyrene, polyvinylidene chloride and polyvinyl chloride.

(8) The fuel cell as described in any one of the above items (1) to (7), wherein the fuel-storing vessel and the housing box member each described above assume a multilayer structure in which the resin layer comprises two or more layers, and at least one layer of the resin layers comprises a gas non-permeable resin.

(9) The fuel cell as described in any one of the above items (1) to (8), wherein the multilayer structure of the fuel-storing vessel and the housing box member each described above is formed by applying a gas non-permeable resin.

(10) The fuel cell as described in the above item (8) or (9), wherein the gas non-permeable resin layer described above has a thickness of 10 to 2000 μm.

(11) The fuel cell as described in any one of the above items (1) to (10), wherein the fuel-storing vessel and the housing box member each described above are covered with a gas non-permeable thin film member.

(12) The fuel cell as described in the above item (11), wherein the gas non-permeable thin film member described above is at least one selected from a metal foil, a metal oxide-deposit and a diamond-like carbon coating substance.

(13) The fuel cell as described in any one of the above items (1) to (12), wherein a releasing part for letting out at least a portion of the pressurized gas filled in the space part to the outside of the liquid fuel-storing tank described above when the liquid fuel-storing tank is exposed to high temperature is formed at least in a part of the housing box member described above.

(14) The fuel cell as described in any one of the above items (1) to (13), wherein the housing box member described above is formed by joining members of at least two or more parts, and at least one of joining powers between the parts is set to a smaller value than a joining power of the liquid fuel-supplying valve described above.

(15) The fuel cell as described in any one of the above items (1) to (14), wherein the liquid fuel-storing tank described above comprises a cartridge structure detachably connected with the fuel cell main body described above.

(16) The fuel cell as described in any one of the above items (1) to (15), wherein the fuel cell main body described above assumes a structure in which plural unit cells each of which is formed by constructing an electrolyte layer on the outer surface of a fuel electrode body and constructing an air electrode layer on the outer surface of the electrolyte layer are connected and in which the fuel-supplying member connected with the liquid fuel-storing tank is coupled with the unit cells to supply the liquid fuel.

The "light transmittance" prescribed in the present invention (including examples described later) means a light transmittance measured by a method prescribed in JIS K 7105-1981.

Effects of the Invention

According to the present invention, provided is a fuel cell in which a liquid fuel is stably supplied directly to a fuel electrode of a fuel cell main body and loss of the liquid fuel is not caused in storing and in which the liquid fuel are less liable to boil and vaporize even when left standing in the environment of high temperature and a size thereof can be reduced.

According to the inventions of claims 2 to 16, obtained is a fuel cell in which a liquid fuel is more stably supplied directly to a fuel cell main body and a use situation of the fuel can readily be visually observed and in which loss of the liquid fuel is very small in storing and the liquid fuel are further less liable to boil and vaporize even when left standing in the environment of high temperature.

LIST OF REFERENCE NUMERALS AND LETTERS

Figure 1:
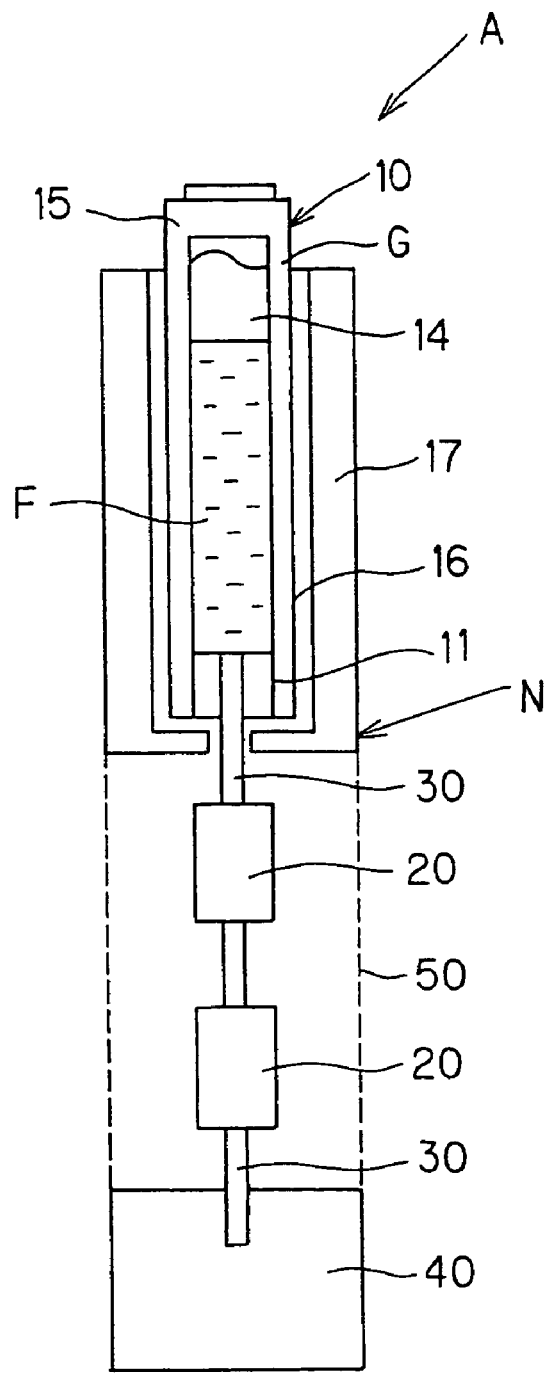
FIG. 1 is an outline cross-sectional drawing showing a fuel cell of the first embodiment according to the present invention in a vertical cross-sectional aspect.

A: Fuel cell
F: Liquid fuel
G: Pressurized gas
10 Fuel-storing tank
11 Liquid fuel reservoir
12 Fuel-storing vessel
13 Fuel discharge part
13a Fuel discharge valve
14 Follower
15 Space part
16 Housing box member

BEST MODE FOR CARRYING OUT THE INVENTION

The embodiments of the present invention shall be explained below in details with reference to the drawings.

Figure 2:
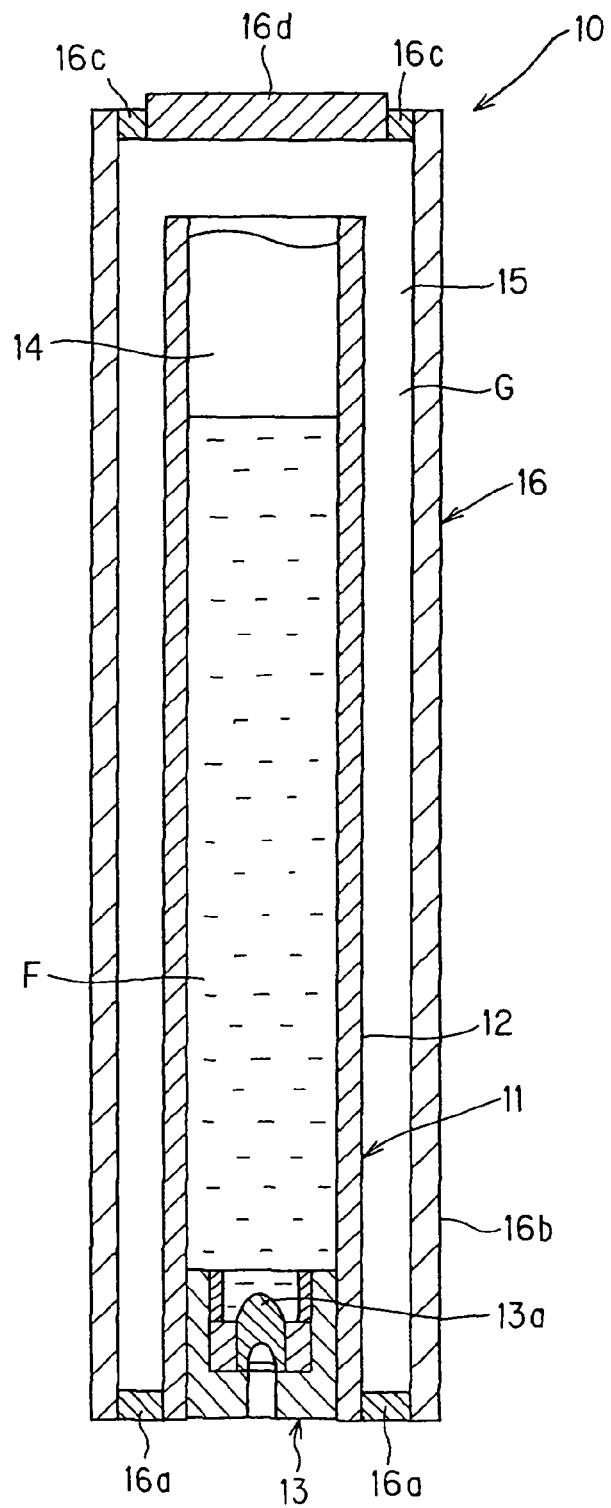
FIG. 2 is an outline cross-sectional drawing showing a fuel-storing tank used for the fuel cell of the first embodiment according to the present invention in a vertical cross-sectional aspect.
Figure 3A:
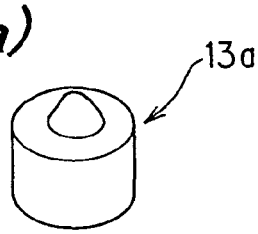
FIG. 3(a) to (e) show a valve structure of a fuel discharge valve provided in the fuel discharge part of the first embodiment according to the present invention, wherein (a) is a perspective drawing of the valve; (b) is a plain view of the valve; (c) is a vertical cross-sectional drawing of the valve; (d) is a plain view of an adaptor; (e) is a vertical cross-sectional drawing of the adaptor; (f) is a plain view of a state in which the valve is installed in the adaptor; and (g) is a vertical cross-sectional drawing of a state in which the valve is installed in the adaptor.
Figure 3B:
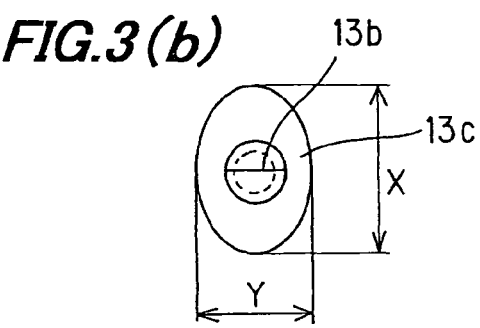
Figure 3C:
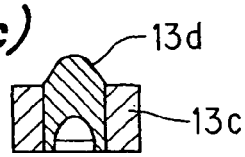
Figure 3D:
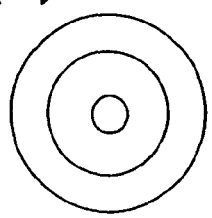
Figure 3E:
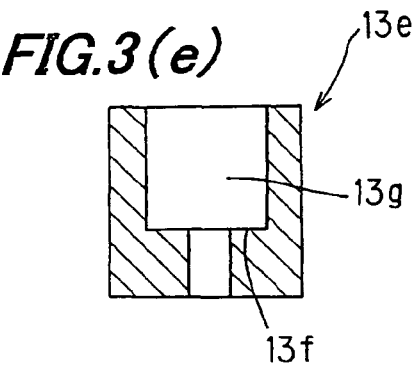
Figure 3F:
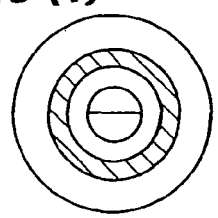
Figure 3G:
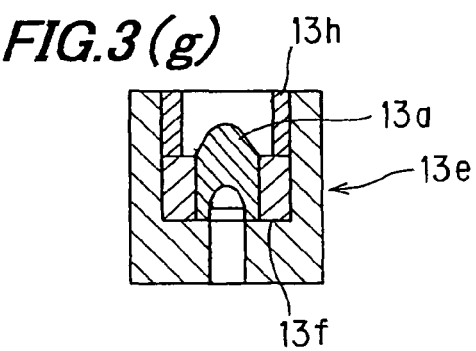
Figure 4A:
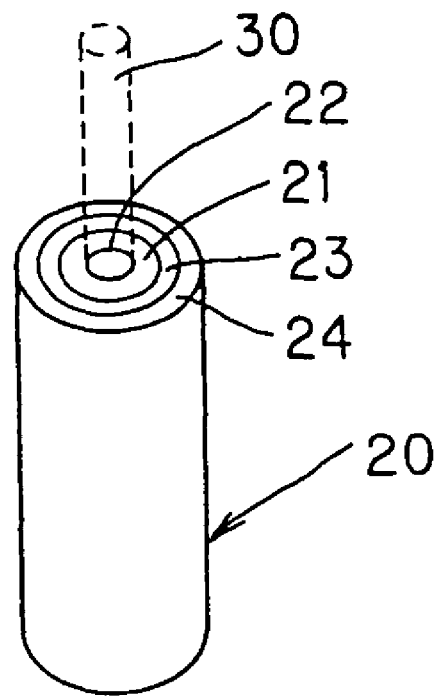
FIG. 4(a) is a perspective drawing of a unit cell of the fuel cell of the first embodiment according to the present invention, and (b) is a vertical cross-sectional drawing of the unit cell.
Figure 4B:
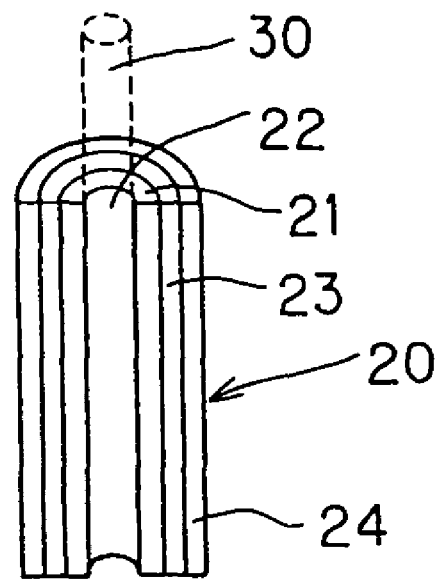

FIG. 1 to FIG. 4 are drawings showing a fuel cell of the first embodiment according to the present invention; FIG. 1 is an outline cross-sectional drawing of the whole part; FIG. 2 is a vertical cross-sectional drawing of a fuel-storing tank; FIG. 3 is an explanatory drawing of a valve structure of the fuel discharge valve provided in the fuel discharge part; and FIG. 4 is an explanatory drawing of a unit cell in the fuel cell of the first embodiment.

The fuel cell of the first embodiment is, as shown in FIG. 1 to FIG. 3, a fuel cell A having a liquid fuel-storing tank 10 which is detachably connected with a fuel cell main body N and which stores a liquid fuel F and assuming a structure in which the liquid fuel F is supplied to the fuel cell main body N via a fuel-supplying member 30 which has a penetrating structure and is connected with the liquid fuel-storing tank 10, and assumed is a structure in which the liquid fuel-storing tank 10 is equipped with a liquid fuel reservoir 11 and a housing box member 16 which encompasses at least a part of the liquid fuel reservoir 11 via a space part 15 and whose rear end part is closed; the liquid fuel reservoir 11 described above comprises a cylindrical (tube type) fuel-storing vessel 12 for storing the liquid fuel F, a fuel discharge part 13 provided at a lower part of the fuel-storing vessel 12 and having a fuel discharge valve 13a and a follower 14 which moves as the liquid fuel is consumed and which seals the above liquid fuel at a rear end of the liquid fuel F stored in the fuel-storing vessel 12; and pressurized gas for pressurizing the liquid fuel F is filled in the space part 15 provided between the liquid fuel reservoir 11 and the housing box member 16 each described above.

The liquid fuel F stored in the fuel-storing vessel 12 of a tube type in the liquid fuel reservoir 11 includes, for example, a methanol solution comprising methanol and water, but the liquid fuel shall not specifically be restricted as long as hydrogen ions ($H^+$) and electrons ($e^-$) are efficiently obtained from a compound supplied as fuel at a fuel electrode body described later. Liquid fuels such as dimethyl ether (DME), an ethanol solution, formic acid, hydrazine, ammonia solution, ethyleneglycol, a saccharide aqueous solution and sodium boron hydride can be used as well, though depending on the structure of the fuel electrode body.

The above liquid fuels having various concentrations can be used according to the structure and the characteristics of the fuel cell, and the liquid fuels having a concentration of, for example, 1 to 100% can be used.

In respect to the materials of the fuel-storing vessel 12 and the housing box member 16 each described above, storage stability, durability and gas non-permeability (gas non-permeability against oxygen gas, nitrogen gas and the like) are required to the liquid fuel described above and a follower described later.

Further, the materials have preferably light transmittance so that a remaining amount of the liquid fuel can be visually observed. In respect to light transmittance which makes it possible to visually observe a remaining amount of the liquid fuel, if it is 50% or more, the content can be visually observed regardless of the material and a thickness thereof. More preferably, if the light transmittance is 80% or more, there are no problems in terms of actual use, and visibility of the liquid fuel is further enhanced.

In order to prevent the liquid fuel from leaking and vaporizing and prevent air from penetrating into the fuel-storing tank, it is preferably constituted from a gas non-permeable material. More preferably, if the oxygen gas permeability thereof is 100 cc·25 µm/m²·24 hr·atm (25° C., 65% RH) or less, there are no problems in terms of actual use.

In respect to the materials of the fuel-storing vessel 12 (including the fuel-supplying tube 30) and the housing box member 16, the preferred materials include metals such as aluminum and stainless steel, synthetic resins and glass when light transmittance is not required, and from the viewpoints of visibility of the remaining amount of the liquid fuel, a gas non-permeability, reduction in a cost in producing and assembling and easiness of the production, preferred is a constitution comprising a single kind or two or more kinds of resins such as polyvinyl alcohol, ethylene•vinyl alcohol copolymer resins, polyacrylonitrile, nylon, cellophane, polyethylene terephthalate, polycarbonate, polystyrene, polyvinylidene chloride and polyvinyl chloride, and more preferably, resins having a light transmittance of 50% or more, particularly preferably 80% or more are selected from the above resins.

Particularly preferably, they are polyvinyl alcohol, ethylene•vinyl alcohol copolymer resins, polyacrylonitrile, cellophane and polyvinylidene chloride which are gas non-permeable and have a light transmittance of 80% or more.

The fuel-storing vessel 12 and the housing box member 16 comprise preferably a multilayer structure of two or more layers and comprise desirably a multilayer structure of two or more layers in which at least one layer is constituted from a material containing the resin group described above which have the gas non-permeability and the light transmittance described above. If at least one layer in the multilayer structure described above is constituted from the resin having the performance (gas permeability) described above, the other layers may be constituted from usual resins, and no problems in terms of actual use shall be involved therein. A tube having such multilayer structure as described above can be produced by extrusion molding, injection molding, coextrusion molding and the like.

Further, in place of at least one gas non-permeable layer produced by molding, a gas non-permeable layer can be provided by coating a solution of a resin selected from the resin group described above. In this coating method, more specific production facilities than in the production by molding such as extrusion molding, injection molding and the like described above are not required, and it can conveniently be produced.

The gas non-permeable layer provided by the above various molding methods and coating has preferably a thickness of 10 to 2000 µm. If this thickness is less than 10 µm, the gas non-permeability can not be exhibited. On the other hand, if it exceeds 2000 µm, the performances of the whole part of the vessel such as light transmittance and flexibility are deteriorated.

Further, in place of the gas non-permeable layer formed from the resins described above by molding or coating, it can be provided by covering with a gas non-permeable thin film member such as a gas non-permeable film. The gas non-permeable thin film member covered includes preferably at least one selected from metal foils such as an aluminum foil, metal oxide deposits such as alumina and silica and diamond-like carbon coating materials. Such gas non-permeability as described above can be exhibited by covering the outer surface of the fuel-storing vessel 12 with the non-permeable thin film members. The non-permeable thin film member has preferably a thickness of 10 to 2000 µm as is the case with what has been described above. When the gas non-permeable thin film member described above is a member having no visibility, for example, an aluminum foil, it is not applied in part to such an extent that gas non-permeability is not damaged, and it is applied in a lattice form or a stripe form to provide an inspection window. A gas non-permeable film having light transmittance can cover the inspection window to secure gas non-permeability and visibility.

The fuel discharge part 13 is equipped with a valve 13a which is a fuel discharge valve for sealing communication between the inside and the outside of the cylindrical fuel-storing vessel 12, and a structure in which the valve 13a is installed in the fuel discharge part 13 directly or via a valve adaptor is assumed in the present embodiment. This valve 13a assumes the same structure as that of a member used in writing instruments, and the liquid fuel F stored directly in the fuel-storing vessel 12 is protected, as shown in FIG. 3(a) to (c), from foreign matters such as air coming from the periphery of a fuel-supplying tube described later due to a change in barometric pressure and temperature.

The valve 13a is provided with a communicating part 13b comprising a linear slit for supplying the liquid fuel F in the inside of the fuel-storing vessel 12 to the outside, which allows to communicate between the inside and the outside of the fuel-storing vessel by inserting a liquid fuel-supplying member. In addition thereto, when the valve 13a is installed in the fuel discharge part 13 or the valve adaptor, the valve 13a is compressed to a diameter direction by a valve outer periphery part 13c, whereby compressing force works on the communicating part 13b described above. In the present embodiment, the valve is elliptic as shown in FIG. 3(b); a slit 13b which is a communicating part is provided in a minor axis direction Y; the outer periphery part 13c is compressed in a major axis direction X; and the compressing force works in a direction in which the slit 13b is closed.

The communicating part 13b described above is formed by a linear slit, and it shall not specifically be restricted as long as it assumes a structure in which the fuel-storing vessel 12 can be communicated by inserting a liquid fuel-supplying member to supply the liquid fuel F in the inside of the fuel-storing vessel 12 to the outside. It may be a cross-shaped or radial slit, a structure in which plural slits are formed so that the respective slits are crossed in the same spot, a circular hole or a rectangular hole. It is preferably the linear slit described above. The shape of the outer periphery part 13c shall not specifically be restricted, and it can be formed in a circular shape as well as an elliptical shape as is the case with the embodiment described above.

A convex tapered face (projection) 13d is preferably formed on an inner face side of the valve 13a toward the inside of the fuel-storing vessel 12 so that the liquid fuel-supplying member can smoothly be inserted when inserting it.

Such an adaptor 13e as shown in FIGS. 2(d) and (e) is provided in the fuel discharge part 13 described above, and the adaptor 13e is formed in a cylindrical shape and comprises a main body part 13g in which stopper part 13f is formed on an inner peripheral face thereof and a fixing member 13h which is formed in a cylindrical shape. The valve 13a having the constitution described above is interposed between the stopper part 13f and the fixing member 13h.

The combination of the valve 13a and the adaptor 13e includes a case of an elliptical slit valve and a circular adaptor as shown in FIG. 3, and in opposition, it may be a circular slit valve and an elliptical adaptor. In this case, a slit direction of the slit valve has to be consistent with a major axis of the adaptor.

The valve 13a having the structure described above provides a structure in which foreign matters such as air are prevented from coming in during suspending use (no use) thereof. This is to prevent accidents such as leaking and spouting of the fuel caused by increase of a pressure in the liquid fuel-storing vessel 12 which is brought about by coming in of air.

The valve 13a and the adaptor 13e are preferably, from the viewpoint of preventing more effectively leaking of the liquid fuel, those which have the structures described above and comprise materials having low gas permeability toward the liquid fuel F and which are constituted from materials having a compression set of 20% or less prescribed in JIS K 6262-1997.

The materials for the above valve 13a and adaptor 13e shall not specifically be restricted as long as they have storage stability, durability against the liquid fuel F stored and gas non-permeability and elasticity by which the valve and adaptor can be adhered tightly to the fuel-supplying tube and have the characteristics described above. They include synthetic resins such as polyvinyl alcohol, ethylene•vinyl alcohol copolymer resins, polyacrylonitrile, nylon, cellophane, polyethylene terephthalate, polycarbonate, polystyrene, polyvinylidene chloride and polyvinyl chloride, rubbers such as natural rubber, isoprene rubber, butadiene rubber, acrylonitrile-butadiene rubber, 1,2-polybutadiene rubber, styrene-butadiene rubber, chloroprene rubber, nitrile rubber, butyl rubber, ethylene-propylene rubber, chlorosulfonated polyethylene rubber, acryl rubber, epichlorohydrin rubber, polysulfide rubber, silicone rubber, fluorocarbon rubber and urethane rubber and thermoplastic elastomers. They can be produced by conventional injection molding and vulcanizing molding.

The follower 14 is brought into contact with the rear end of the liquid fuel F stored in the fuel-storing vessel 12 to seal the liquid fuel F, and it moves as the fuel is consumed. It prevents the liquid fuel in the fuel-storing vessel 12 from leaking and vaporizing, and it prevents air from coming into the liquid fuel.

This follower 14 is required not to be dissolved or diffused in the liquid fuel F. If it is dissolved or diffused in the liquid fuel F, it is considered that the liquid fuel in the fuel-storing vessel 10 which is a fuel-storing tank leaks and vaporizes and that not only it does not play a role as a fuel-storing tank, but also the liquid fuel F allows the substance constituting the follower 14 to come into the fuel electrode of the fuel cell main body to exert an adverse effect on the reaction in a certain case. Further, the follower 14 has preferably lower surface free energy than that of the liquid fuel F, and allowed to be assumed is a constitution in which the liquid fuel can further be prevented from penetrating into a gap between the fuel-storing vessel 12 and the follower 14 to leak to the outside. Taking the above conditions into consideration, the material and the surface condition of the follower 14 used in the present invention are suitably selected, and the preferred follower can be produced.

Capable of being given as a material for the above follower 14 are, for example, petroleums such as mineral oils, polyglycols, polyesters, polybutene, and silicone oils, and those in which a viscosity is increased by mixing solvents with aliphatic metal soaps, modified clay, silica gel, carbon black, natural or synthetic rubbers or various synthetic polymers.

Further, in order to prevent the follower 14 and the liquid fuel 11 from being reversed and further enhance followability of the follower when a large volume of the liquid fuel is stored, a follower auxiliary member may be provided between the liquid fuel F and the follower 14.

In the present embodiment, pressurized gas for pressurizing the liquid fuel F is charged, as shown in FIG. 1 and FIG. 2, in the hermetically sealed space part 15 provided between the liquid fuel reservoir 11 and the housing box member 16.

The pressurized gas is used for pressurizing the liquid fuel F including the follower 14 installed in the fuel-storing vessel 12 which is opened at the rear end, and it comprises, for example, inert gas such as nitrogen gas, argon gas and helium gas. A pressurizing state of 1200 to 3000 hPa is preferred from the viewpoint of allowing the liquid fuel F to discharge well from the fuel discharge part 13, the viewpoint of pressurizing the fuel in the above space part 15 when left standing under the environment of high temperature to make the liquid fuel less liable to boil and vaporize and the viewpoint of securing durability of a cartridge itself.

A volume of the space part 15 is preferably 1.5 to 6 times based on a stored volume of the liquid fuel from the viewpoint of allowing the liquid fuel F to discharge well from the fuel discharge part 13 and the viewpoint of causing less heat conduction in the space part when left standing under the environment of high temperature to make the liquid fuel less liable to boil and vaporize.

The material of the housing box member 16 is, as described above, the same as that of the fuel-storing vessel 12. The housing box member 16 is produced from the same material, however, it preferably includes a member having a structure in which in the present embodiment, the member is formed of junction members of two or more parts comprising materials having the respective characteristics described above for constituting the housing box member 16, junction members 16a to 16d and by joining them with supersonic fusion and laser fusion and in which at least one of the junction members lets out pressurized gas filled in the space part 15 to the outside when the liquid fuel-storing tank 11 is exposed to high temperature (for example, under the condition of 75° C. or higher for 30 minutes or longer), for example, a structure in which a junction part in the junction member 16c is broken with setting junction force of the junction member 16c to a smaller value than interfitting force or junction force between the fuel-storing vessel 12 and the fuel discharge part 13.

Adoption of the above structures makes it possible to cause first breakdown (destruction) of interfitting or junction at the junction part of the junction member 16c when the space part 15 is unexpectedly pressurized at high temperature to prevent the fuel from spouting accidentally from the valve of the fuel discharge part 13 to the fuel-supplying member 30.

The fuel-storing vessel 12, the fuel discharge part 13, the housing box member 16 and the fuel-supplying tube 30 are joined respectively by interfitting. In this case, if the respective members have a higher surface free energy than that of the liquid fuel, the liquid fuel is liable to get into gaps at the junctions, and the possibility that the liquid fuel leaks is enhanced. Accordingly, a surface free energy of the above members is preferably controlled to a lower level than that of the liquid fuel on at least a wall surface thereof brought into contact with the liquid fuel. The controlling can be carried out by a method in which a wall surface brought into contact with the liquid fuel in the fuel-storing vessel is subjected to water repellent film-forming treatment with coating a water repellent agent of a silicone base or a fluorine base.

The respective cells (unit cells) 20 which constitute a fuel cell main body have, as shown in FIGS. 4(a) and (b), a fuel electrode body 21 comprising a fine porous carbonaceous pillar body and in addition thereto, have a through part 22 in a central part thereof through which a fuel-supplying member 30 passes, and they assume a structure in which an electrolyte layer 23 is constructed on the outer surface of the fuel electrode body 21 described above and in which an air electrode layer 24 is constructed on the outer surface of the electrolyte layer 23. The respective unit cells 20 generate an electro motive force of about 1.2 V per cell in theory.

This fuel-storing tank 10 is, as shown in FIG. 1, connected with the fuel cell main body N and used.

That is, the fuel cell main body N is equipped, as shown in FIG. 1, with the unit cells 20, 20 each of which is formed by constructing the electrolyte layer 23 on the outer surface of the fuel electrode body 21 comprising a fine porous carbonaceous body and constructing the air electrode layer 24 on the outer surface of the electrolyte layer 23, the fuel-supplying member 30 having a penetrating structure connected with the fuel-storing tank 10 and a used fuel-storing tank 40 provided at an end of the fuel-supplying member 30. Assumed is a structure in which the respective unit cells 20, 20 are connected in series and in which the fuel is supplied in order by means of the fuel-supplying member 30. The fuel-storing tank 10 has an exchangeable cartridge structure and assumes a constitution in which it is inserted into a supporter 17 for the fuel cell main body N.

In this embodiment, the liquid fuel F is directly stored as shown in FIG. 1 to FIG. 3, and the fuel is supplied by means of the fuel-supplying member 30 inserted into the fuel discharge valve 13a installed in the fuel discharge part 13 at a lower part of the fuel-storing vessel 12 for storing the liquid fuel F.

The respective unit cells 20 have, as shown in FIGS. 4(a) and (b), the fuel electrode body 21 comprising a fine porous carbonaceous pillar body and in addition thereto, have the through part 22 in a central part thereof through which the fuel-supplying member 30 passes, and they assume a structure in which the electrolyte layer 23 is constructed on the outer surface of the fuel electrode body 21 and in which the air electrode layer 24 is constructed on the outer surface of the electrolyte layer 23. The respective cells 20 generate an electromotive force of about 1.2 V per cell in theory.

The fine porous carbonaceous pillar body constituting the fuel electrode body 21 may be any ones as long as they are porous structures having fine communication holes, and it includes, for example, carbon composite molded articles which comprise a three-dimensional network structure or a point sintered structure and which are constituted from amorphous carbon and carbon powder, isotropic high density carbon molded articles, carbon fiber paper-making molded articles and activated carbon molded articles, and the carbon composite molded articles which comprise amorphous carbon and carbon powder and which have fine communication holes are preferred from the viewpoint of easiness in controlling reaction in the fuel electrode of the fuel cell and further rise in the reaction efficiency.

The carbon powder used for producing the carbon composite comprising a porous structure is preferably at least one (alone or combination of two ore more kinds thereof) selected from highly oriented pyrolytic graphite (HOPG), kish graphite, natural graphite, artificial graphite, carbon nanotube and fullerene from the viewpoint of further rise in the reaction efficiency.

A platinum-ruthenium (Pt—Ru) catalyst, an iridium-ruthenium (Ir—Ru) catalyst and a platinum-tin (Pt—Sn) catalyst are formed on the outer surface of the fuel electrode body 21 by a method in which a solution containing the above metal ions or a metal fine particle precursor such as metal complexes is subjected to impregnating or dipping treatment and then subjected to reducing treatment and a method of electrodeposition of metal fine particles.

The electrolyte layer 23 includes ion exchange membranes having proton conductivity or hydroxide ion conductivity, for example, fluorine base ion exchange membranes including Nafion (manufactured by Du Pont Co., Ltd.), and in addition thereto, it includes membranes in which heat resistance and inhibition in methanol crossover are good, for example, composite membranes comprising an inorganic compound as a proton conducting material and a polymer as a membrane material, to be specific, composite membranes using zeolite as the inorganic compound and styrene-butadiene base rubber as the polymer, and hydrocarbon base graft membranes.

The air electrode layer 24 includes porous carbonaceous bodies on which platinum (Pt), palladium (Pd) and rhodium (Rh) are carried by a method using a solution containing the metal fine particle precursor described above and which comprise a porous structure.

The fuel-supplying member 30 shall not specifically be restricted as long as it has a penetrating structure and it can be inserted into the valve 13a in the fuel-storing tank 10 to supply the liquid fuel to the respective unit cells 20, and it includes, for example, those comprising porous bodies having capillary force which are constituted from felts, sponges, sintered bodies such as resin particle-sintered bodies and resin fiber-sintered bodies and fiber bundles comprising one or combination of two or more kinds of natural fibers, animal hair fibers, polyacetal base resins, acryl base resins, polyester base resins, polyamide base resins, polyurethane base resins, polyolefin base resins, polyvinyl base resins, polycarbonate base resins, polyether base resins and polyphenylene base resins. A porosity of the above porous bodies and fiber bundles is suitably set according to a supplying amount of the liquid fuel to the respective unit cells 20.

The used fuel-storing tank 40 is disposed at an end of the fuel-supplying member 30. In this case, it provides no problems to bring the used fuel-storing tank 40 into direct contact with the end of the fuel-supplying member 30 to occlude the used fuel directly in an occlusion body, and a sliver, a porous body or a fiber bundle may be provided as a feed at a junction brought into contact with the fuel-supplying member 30 to set it as a discharge passage for the used fuel.

The liquid fuel supplied by the fuel-supplying member 30 is used for reaction in a unit cell of fuel cell 20, and since a fuel-supplying amount is linked with a fuel-consuming amount, the liquid fuel which is discharged to the outside of the cell without reacting is scarcely found, so that a treating system is not required at the fuel outlet side as is the case with conventional liquid fuel type fuel cells. However, assumed is a structure in which when the fuel comes to be supplied in excess depending on an operation status, the liquid fuel which is not used for the reaction can be stored in the storing tank 40 to prevent inhibitory reaction.

Numeral 50 is a member comprising a mesh structure which joins the fuel reservoir 11 with the used-fuel storing tank 40 and which allows the liquid fuel to be surely supplied from the fuel-storing tank 10 directly to each of the respective unit cells 20, 20 via the fuel-supplying member 30.

In the fuel cell A thus constituted, the liquid fuel is supplied from the fuel-storing tank 10 to the fuel-supplying member 30 inserted into the valve 13a in the fuel discharge part 13 or the fuel electrode body 21 having a penetrating structure, and it is introduced into the unit cells 20, 20 by virtue of any penetrating structure.

In the fuel cell A of the present embodiment, assumed is a structure in which the fuel-storing tank 10 detachably connected with the fuel cell main body N is equipped with the liquid fuel reservoir 11 and the housing box member 16 which encompasses at least a part of the above liquid fuel reservoir 11 via the space part 15 and whose rear endpart is closed; the liquid fuel reservoir 11 comprises the cylindrical (tube type) fuel-storing vessel 12 for storing the liquid fuel F, the fuel discharge part 13 having a fuel discharge valve provided at a lower part of the fuel-storing vessel 12 and the follower 14 which seals the liquid fuel and which moves as the liquid fuel is consumed at a rear end of the liquid fuel F stored in the fuel-storing vessel 12 described above; and pressurized gas G for pressurizing the liquid fuel F is filled in the space part 15 provided between the liquid fuel reservoir 11 and the housing box member 16 each described above. Accordingly, it becomes possible to turn the whole part of the fuel cell into a cartridge, and a use situation of the fuel can be visually observed with ease. The fuel is pressurized by the pressurized gas filled in the space part 15 formed by the liquid fuel reservoir 11 and the housing box member 16, and therefore it is possible to make the liquid fuel less liable to boil and vaporize under the environment of high temperature without providing a device for pressurization in the outside. Further, the housing box member 16 is provided in a space in the periphery of the liquid fuel reservoir 11, and therefore a volume of the pressurized gas is large as compared with a volume of the liquid fuel stored. Accordingly, reduction in a pressure accompanied with decrease in the liquid fuel is small, so that depression in a boiling point of the liquid fuel stored can be reduced during use of the fuel cell.

Thus, the fuel-storing tank 10 in the fuel cell of the present embodiment can make the liquid fuel less liable to boil and vaporize without providing a device for pressurization in the outside even when the above fuel-storing tank is left standing alone under the environment of high temperature.

As described above, a case in which a device for pressurization is not provided as a pressurizing means in the outside has been explained in the present embodiment, but when a device for pressurization is allowed to be provided as a pressurizing means in the outside of the fuel-storing tank, the device for pressurization may be provided in the outside of the fuel-storing tank. In this case, a communication member which can communicate the space part 15 with the device for pressurization is preferably provided, though not specifically illustrated, at any of the housing box member 16 in the fuel-storing tank or the members 16a to 16d constituting the housing box member. The communication member includes a valve and a gas tube, and considering a case in which a pressure is controlled, a gas tube having good reaction to pressure control is preferably provided. Further, a cock for cutting off the pressurized gas may be provided at any part of the communication member.

Further, if a releasing part for letting out the pressurized gas filled in the space part to the outside when the fuel-storing tank is exposed to high temperature is formed in at least a part of the housing box member 16, first breakage (destruction) of interfitting or junction is caused at the junction of the junction member 16c when the space part 15 is unexpectedly pressurized at further high temperature to make it possible to prevent the fuel from spouting accidentally from the valve in the fuel discharge part 13 to the fuel-supplying member 30.

Further, in the embodiment described above, capillary force is present in at least the fuel electrode body 21 and/or the fuel-supplying member 30 brought into contact with the fuel electrode body 21, and this capillary force makes it possible to supply stably and continuously the liquid fuel directly from the fuel-storing vessel 10 to each of the respective unit cells 20, 20 without bringing about back flow and interruption of the fuel. More preferably, setting capillary force of the used fuel-storing tank 40 to a larger value than capillary force present in the fuel electrode body 21 and/or the fuel-supplying member 30 brought into contact with the fuel electrode body 21 makes it possible to flow stably and continuously the liquid fuel directly from the fuel-storing tank 10 and the respective unit cells 20, 20 up to the used fuel-storing tank respectively without bringing about back flow and interruption of the fuel.

Further, assumed in the above fuel cell is a structure in which the liquid fuel can smoothly be supplied as it is without vaporizing without using specifically auxiliary appliances such as a pump, a blower, a fuel carburetor and a condenser, and therefore it becomes possible to further reduce a size of the fuel cell.

Accordingly, in the fuel cell of the above embodiment, it becomes possible to turn the whole part of the fuel cell into a cartridge, and provided is a small-sized fuel cell which can be used as an electric power source for portable electronic appliances such as cellular phones and note type personal computers.

In the embodiment described above, a structure in which two unit cells 20 are used has been shown, and a required electromotive force can be obtained by increasing the number of the unit cells 20 joined (serial or parallel) according to the use purposes of the fuel cell. Also, when the liquid fuel F is consumed and exhausted from the fuel-storing tank 10, another fuel-storing tank 10 in which the new liquid fuel F is stored is connected to operate the fuel cell.

FIG. 5 shows another embodiment (second embodiment) of the fuel cell of the present invention. In the following second embodiment and those subsequent thereto, the members having the same structure and exhibiting the same effects as those of the fuel cell of the first embodiment described above shall be given the same reference numerals as in FIG. 1, and the explanations thereof shall be omitted.

Figure 5A:
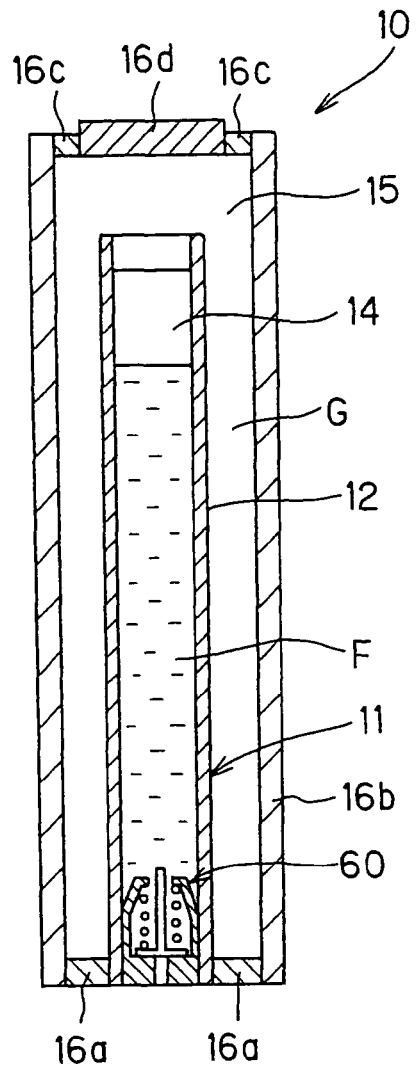
FIG. 5(a) to (c) show another embodiment of a fuel-storing tank used for a fuel cell showing the second embodiment according to the present invention, wherein (a) is a vertical cross-sectional drawing of the fuel-storing tank; (b) is a vertical cross-sectional drawing of the structure of a valve in a fuel discharge valve provided in a fuel discharge part; and (c) is a perspective drawing thereof.
Figure 5B:
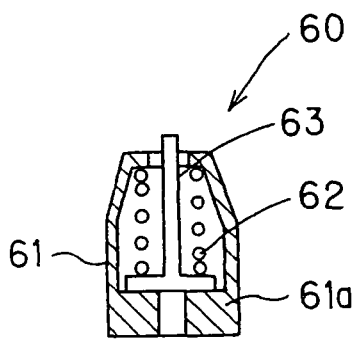
Figure 5C:
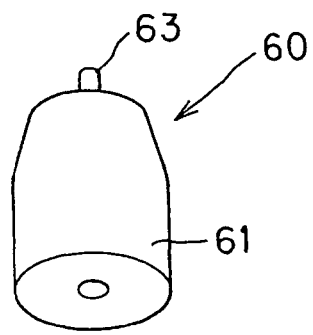

The fuel cell B of this second embodiment is different, as shown in FIG. 5(a) to (c), from the first embodiment described above only in that the valve 13a of the fuel discharge part 13 in the fuel-storing tank 10 in the first embodiment described above is changed to a valve having a structure in which it is closed by a resilient body such as a spring member and opened by inserting a liquid fuel-supplying member, and it exhibits the same working-effects as in the first embodiment.

The above valve 60 has a valve-receiving part 61a in a main body 61, and assumed is a structure in which a valve member 63 having a reverse T-shape in a cross-section is always pressed to the valve-receiving part 61a by a resilient body 62 such as a spring member to close the valve and in which it is opened by inserting a liquid fuel-supplying member 30, whereby a liquid fuel is supplied.

Also in the fuel cell of the second embodiment using the fuel-storing tank 10 thus constituted, the liquid fuel is supplied, as is the case with the first embodiment described above, from the fuel-storing tank 10 to the fuel-supplying member 30 inserted into the valve 60 of the fuel discharge part 13, and then it is introduced into unit cells 20, 20 by virtue of a penetrating structure.

Also in the fuel cell B of the second embodiment, obtained is a fuel cell in which it is possible to make the liquid fuel less liable to boil and vaporize even when left standing under the environment of high temperature without providing a device for pressurization in the outside, in which the liquid fuel is stably supplied directly to the fuel electrode of the fuel cell main body and loss of the liquid fuel is not caused in storing and in which a use situation of the fuel can be visually observed with ease and a size thereof can be reduced.

As described above, a case in which a device for pressurization is not provided as a pressurizing means in the outside has been explained in the present embodiment, but when a device for pressurization is allowed to be provided as a pressurizing means in the outside of the fuel-storing tank, it may be provided in the outside of the fuel-storing tank. In this case, a communication member which can communicate the space part 15 with the device for pressurization is preferably provided, though not specifically illustrated, at any of the housing box member 16 in the fuel-storing tank or the members 16a to 16d constituting the housing box member. The communication member includes a valve and a gas tube, and considering a case in which a pressure is controlled, a gas tube having good reaction to pressure control is preferably provided. Further, a cock for cutting off the pressurized gas may be provided at any part of the communication member.

Figure 6:
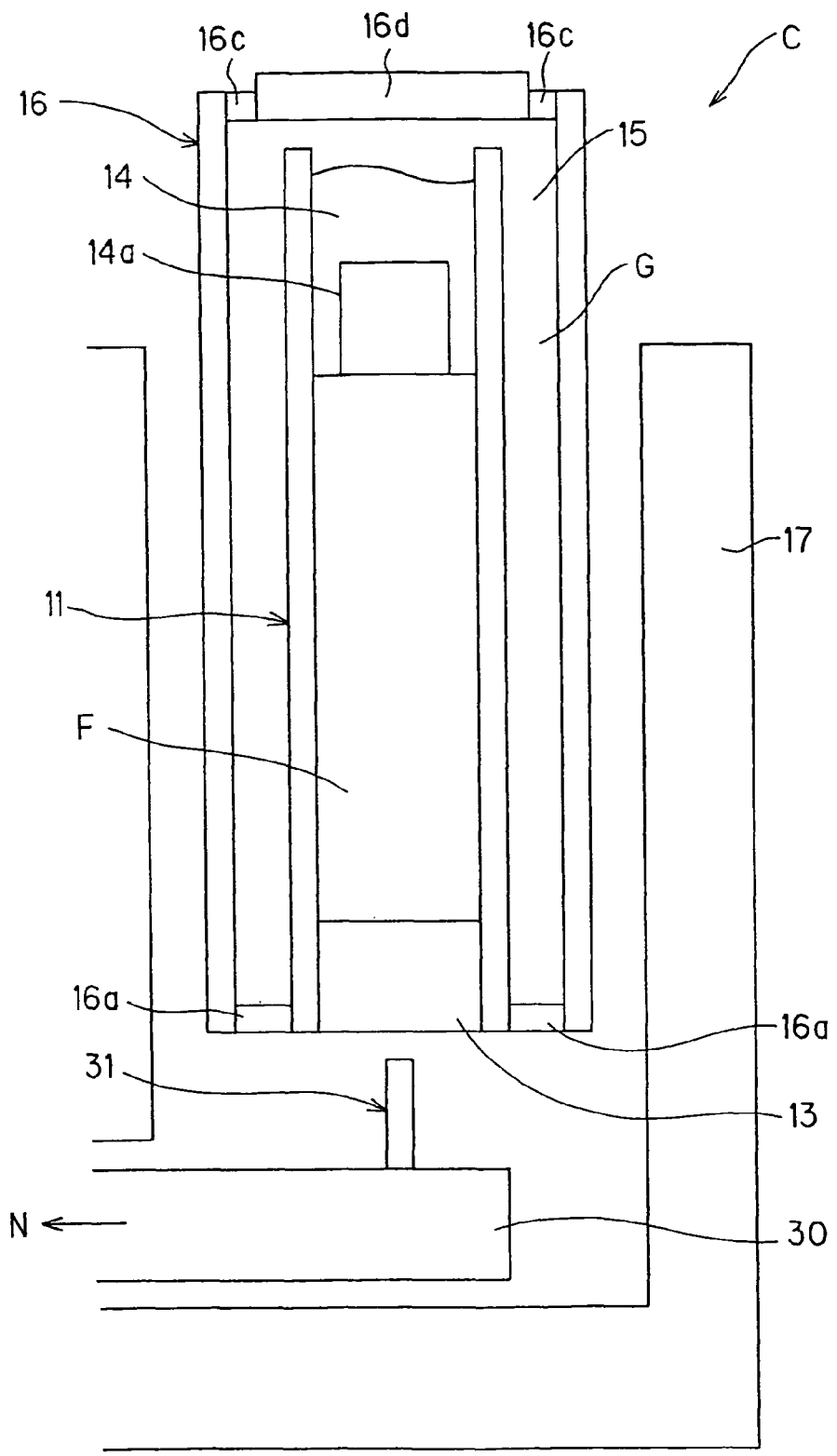
FIG. 6 is a partial cross-sectional drawing showing a state in which a fuel-storing tank in a fuel cell showing the third embodiment according to the present invention is not installed in a fuel cell main body.
Figure 7:
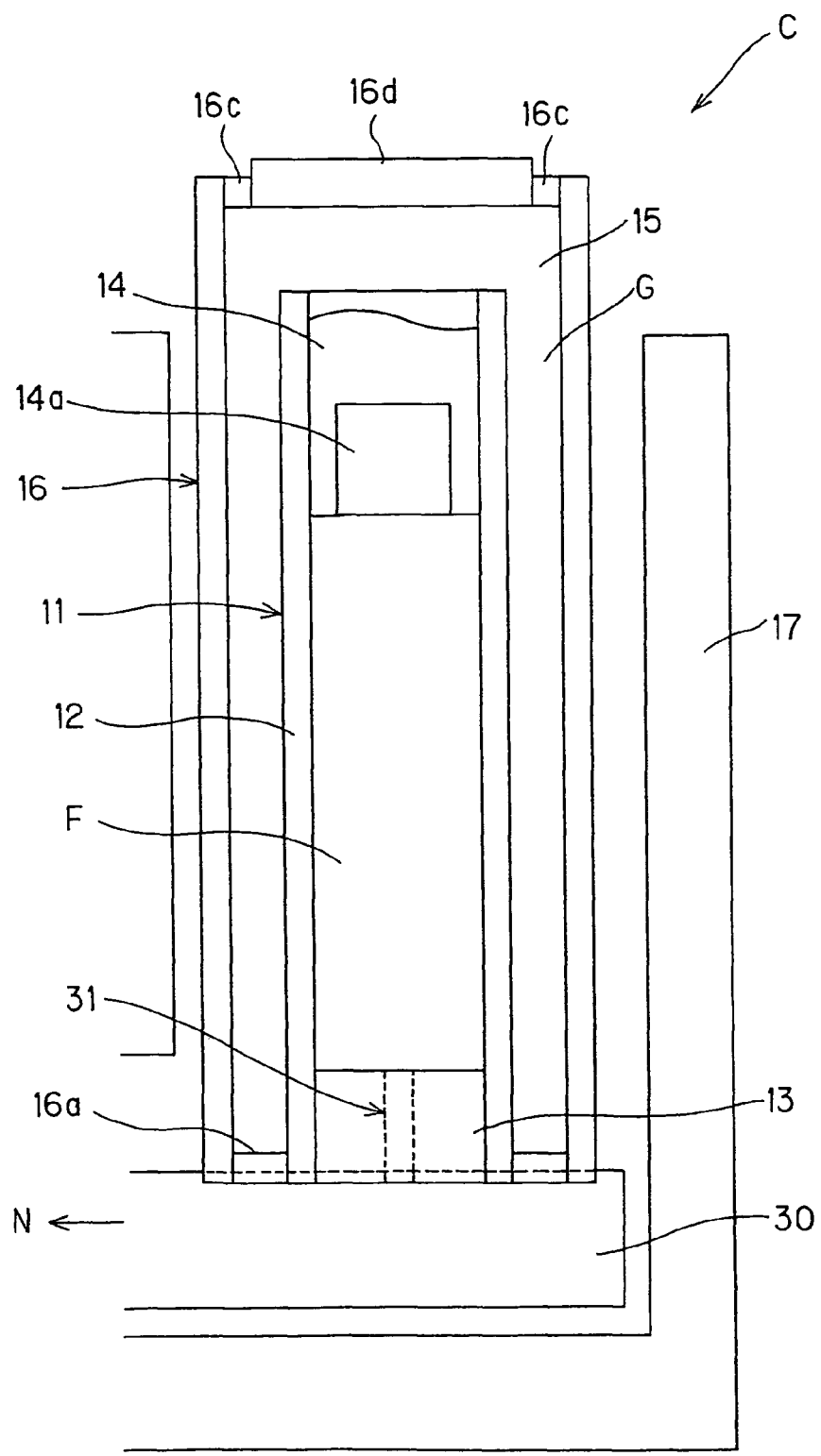
FIG. 7 is a partial cross-sectional drawing showing a state in which the fuel-storing tank in the fuel cell showing the third embodiment according to the present invention is installed in the fuel cell main body.

FIG. 6 and FIG. 7 show another embodiment of connection with the fuel cell main body.

The above embodiment is different, as shown in FIG. 6 and FIG. 7, from the first embodiment described above in that the fuel reservoir is connected with a fuel-supplying member 30 via a fuel-supplying tube 31 inserted into a valve 13a of a fuel discharge part 13 and in that a follower auxiliary member 14a comprising a PP resin is provided in a follower 14, and it exhibits the same working-effects as in the first embodiment.

Assumed is, though not illustrated, a structure in which a tip (an arrow direction in FIG. 6 and FIG. 7) of the fuel-supplying member 30 is joined in series or in parallel with unit cells 20, 20 - - - as is the case with the first embodiment (FIG. 3) described above.

Also in the fuel cell C of the third embodiment, obtained is a fuel cell in which it is possible to make the liquid fuel less liable to boil and vaporize even when left standing under the environment of high temperature without providing a device for pressurization in the outside, in which the liquid fuel is stably supplied directly to the fuel electrode of the fuel cell main body and loss of the liquid fuel is not caused in storing and in which a use situation of the fuel can be visually observed with ease and a size thereof can be reduced.

As described above, a case in which a device for pressurization is not provided as a pressurizing means in the outside has been explained in the present embodiment, but when a device for pressurization is allowed to be provided as a pressurizing means in the outside of the fuel-storing tank, it may be provided in the outside of the fuel-storing tank. In this case, a communication member which can communicate the space part 15 with the device for pressurization is preferably provided, though not specifically illustrated, at any of the housing box member 16 in the fuel-storing tank or the members 16a to 16d constituting the housing box member. The communication member includes a valve and a gas tube, and considering a case in which a pressure is controlled, a gas tube having good reaction to pressure control is preferably provided. Further, a cock for cutting off the pressurized gas may be provided at any part of the communication member.

Figure 8:
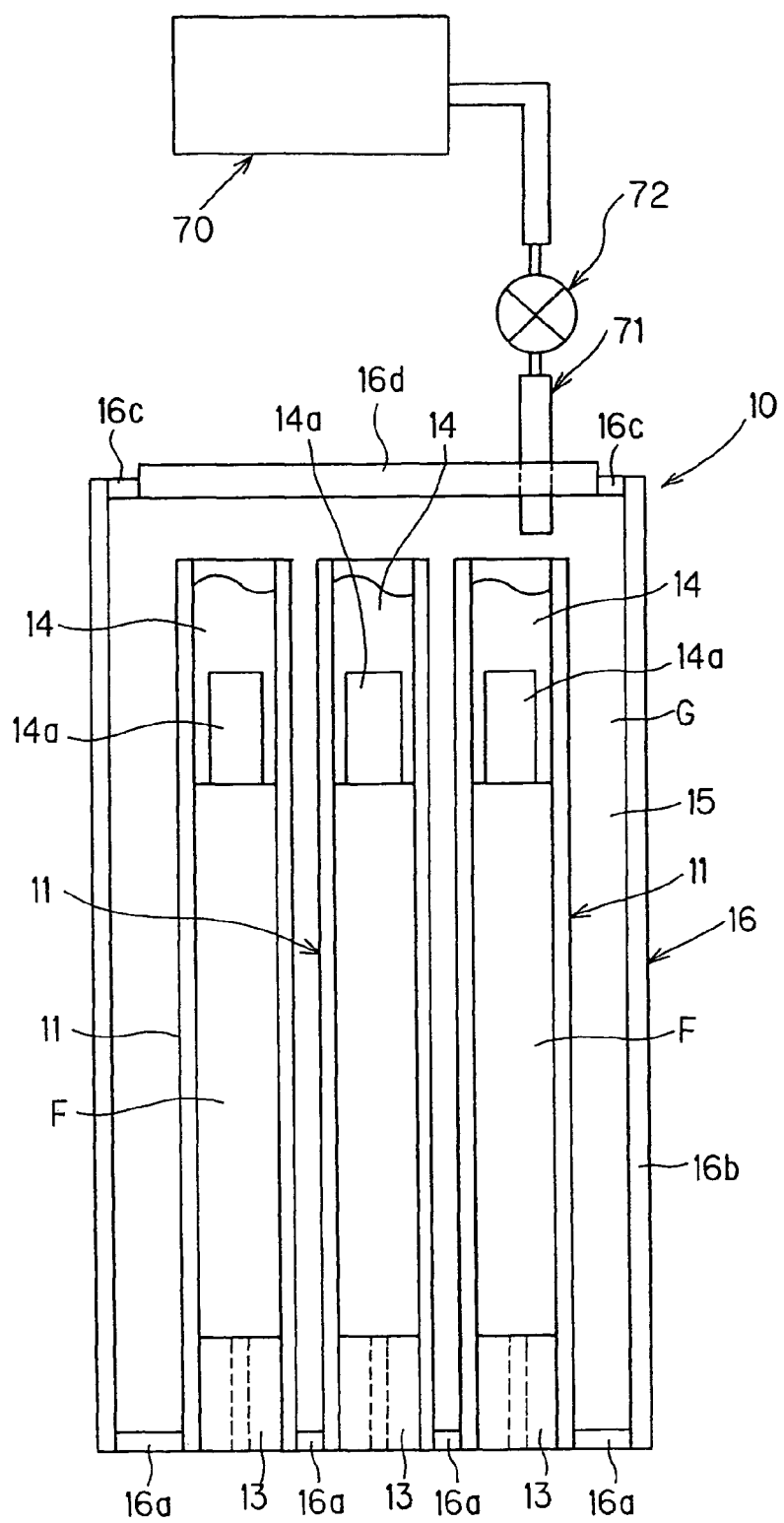
FIG. 8 is a vertical cross-sectional drawing showing a fuel-storing tank in a fuel cell showing the fourth embodiment according to the present invention.
Figure 9:
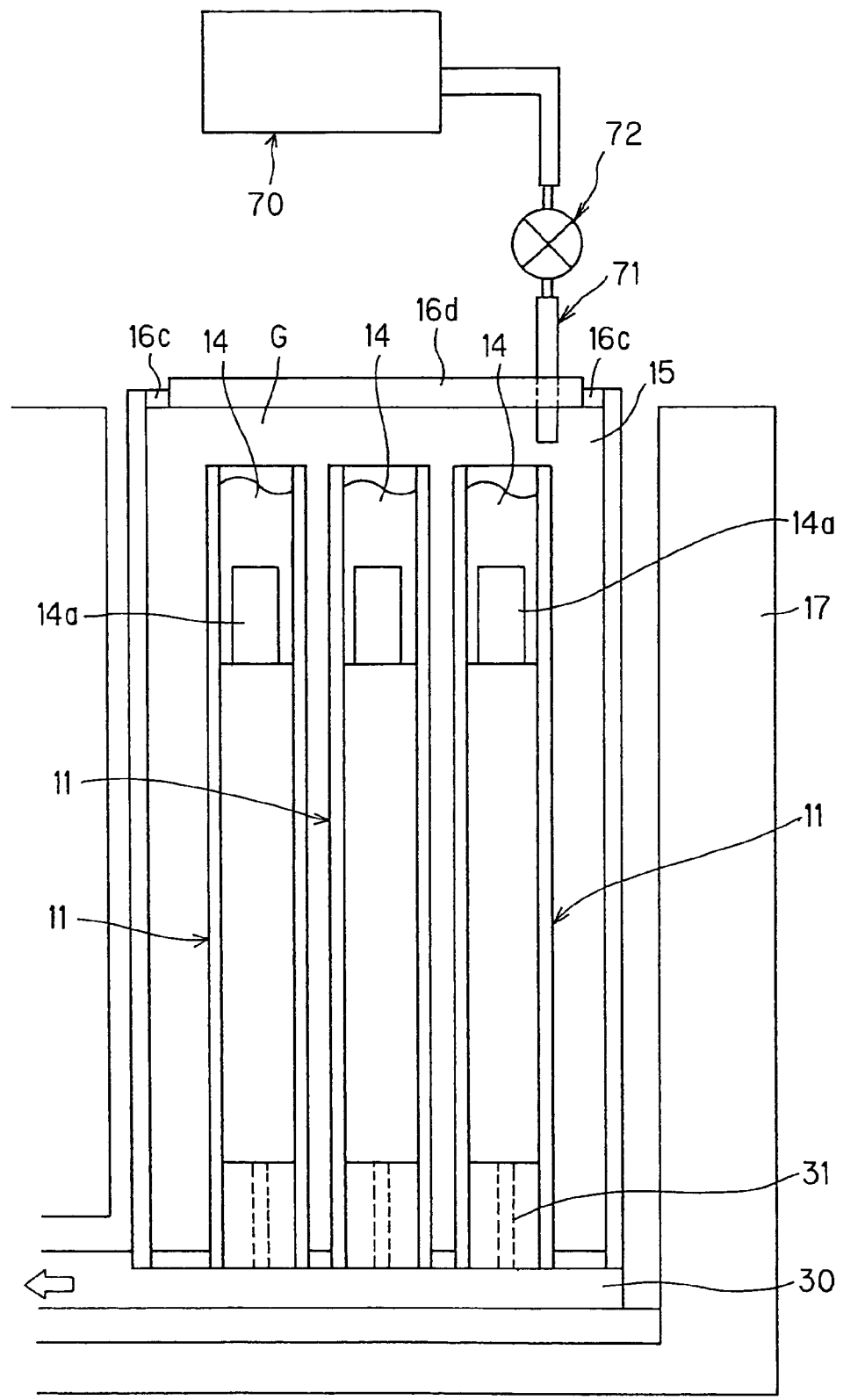
FIG. 9 is a partial cross-sectional drawing showing a state in which the fuel-storing tank in the fuel cell showing the fourth embodiment according to the present invention is installed in a fuel cell main body.

FIG. 8 and FIG. 9 show another embodiment of the fuel-storing tank 10 and another embodiment (the same as in FIG. 6 and FIG. 7) of connection with the fuel cell main body N.

This fourth embodiment is different, as shown in FIG. 8, from the first embodiment described above in that assumed is a structure in which the fuel-storing tank 10 uses three liquid fuel reservoirs 11 having the same structure and in which pressurized gas G for pressurizing a liquid fuel F is filled in a large space part 15a provided between these liquid fuel reservoirs 11 and a housing box member 16, in that the liquid fuel reservoirs are connected with a fuel-supplying member 30 via a fuel-supplying tube 31 inserted into a valve 13a of a fuel discharge part 13, in that a follower auxiliary member 14a comprising a PP resin is provided in a follower 14, in that a device for pressurization 70 is provided in the outside of the fuel-storing tank 10 as a pressurizing means for pressurizing the pressurized gas G in a large space part 15a of the fuel-storing tank 10 and in that a gas tube 71 which is a communication member communicated with the large space part 15a through a member 16d constituting the housing box member 16 of the fuel-storing tank 10 is installed in the pressurizing device 70 and in that a cock 72 for cutting off supply of the pressurized gas is provided in the gas tube 71.

Assumed is, though not illustrated, a structure in which a tip (an arrow direction in FIG. 9) of the fuel-supplying member 30 is joined in series or in parallel with unit cells 20, 20 - - - as is the case with the first embodiment (FIG. 3) described above.

In the fuel cell D of the fourth embodiment, three liquid fuel reservoirs 11 are used in the fuel-storing tank 10 which is a cartridge structure, and therefore obtained is a fuel cell in which a large volume of a liquid fuel can be supplied to extend operation time, in which it is possible to make the liquid fuel less liable to boil and vaporize even when left standing under the environment of high temperature, in which the liquid fuel is stably supplied directly to the fuel electrode of the fuel cell main body and loss of the liquid fuel is not caused in storing and in which a use situation of the fuel can be visually observed with ease and a size thereof can be reduced.

Further, in the present embodiment, the device for pressurization 70 and the cock 71 are provided in the outside of the fuel-storing tank 10 as the pressurizing means for pressurizing the pressurized gas G in the large space part 15a of the fuel-storing tank 10, and therefore a fuel cell in which the liquid fuel is further stably supplied directly to the fuel electrode of the fuel cell main body and in which loss of the liquid fuel is not caused in storing can be prepared. A case in which the device for pressurization 70 is provided in the outside of the fuel-storing tank 10 as the pressurizing means for pressurizing the pressurized gas G has been explained in the present embodiment, but it may be carried out without providing the device for pressurization in the outside as is the case with the first embodiment described above.

The fuel cell of the present invention shall not be restricted to the respective embodiments described above and can be varied to various extents within the scope of the technical concept of the present invention.

For example, the unit cell 20 having a cylindrical shape is used, but it may have other shapes such as a prism shape and a tabular shape. It may be joined with the fuel-supplying member 30 in parallel as well as in series.

In the embodiment described above, the present invention has been explained in the form of a direct methanol fuel cell, but the present invention shall not be restricted to the direct methanol fuel cell as long as it is equipped with the fuel-storing tank 10 assuming the structure of the present invention which is detachably connected with the fuel cell main body, and it can suitably be applied as well to a fuel cell of a reforming type. Further, in a case where the fuel-storing vessel of a tube type is increased in a diameter when a large volume (for example, 100 ml or more) of the liquid fuel is loaded, an amount of the follower is increased to meet it or a follower auxiliary member is inserted as is the case with the third embodiment, whereby the follower can be allowed to follow well without causing interruption.

Further, the fuel cell main body has been constituted by constructing the electrolyte layer comprising the fine porous carbonaceous body on the outer surface of the fuel electrode body and constructing the air electrode layer on the outer surface of the electrolyte layer, but the fuel cell main body shall not specifically be restricted in a structure and may be, for example, a fuel cell main body assuming a constitution in which a porous carbonaceous body having an electric conductivity is a base material and a unit cell obtained by forming the respective layers of electrode/electrolyte/electrode on the surface of the base material or a junction body obtained by connecting two or more of the unit cells is provided and in which the base material is impregnated with a liquid fuel via a fuel-supplying member and comprising a structure in which a surface of an electrode formed on the outer surface of the base material is exposed to air.

EXAMPLES

Next, the present invention shall be explained in further details with reference to examples and a reference example, but the present invention shall not be restricted to the examples described below.

Examples 1 to 4 and Reference Example 1

Example 1

A fuel-storing tank having a constitution described below and based on FIG. 2 was prepared.
Constitution of fuel-storing tank 10:
Fuel-storing vessel 12: length 100 mm, outer diameter 8 mm, inner diameter 6 mm, polypropylene-made extruded tube [light transmittance: 95%, oxygen gas permeability: 2500 cc·25 μm/m$^2$·24 hr·atm (25° C., 65% RH)]
Liquid fuel F: 70 wt % methanol liquid (specific gravity: 0.872) 2 g filled
Composition of follower:
A gelatinous follower (specific gravity: 0.90) having the following formulation was used.

| | |
|---|---|
| Mineral oil: Diana Process Oil MC-W90 (manufactured by Idemitsu Kosan Co., Ltd.) | 93 parts by weight |
| Hydrophobic silica: Aerosil R-974D (manufactured by Nippon Aerosil Co., Ltd., BET surface area: 200 m$^2$/g) | 6 parts by weight |
| Silicone base surfactant: SILWET FZ-2171 (manufactured by Nippon Unicar Co., Ltd.) | 1 part by weight |

Housing box member 16: length 120 mm, outer diameter 14 mm, inner diameter 12 mm, a vessel prepared by hermetically sealing both ends of a polypropylene-made extruded tube [light transmittance: 95%, oxygen gas permeability: 2500 cc·25 μm/m$^2$·24 hr·atm (25° C., 65% RH)] with a polypropylene-made cover.
Volume of space part 15: 10 ml
Pressurized gas G filled: nitrogen gas, 3000 hPa
Fuel discharge part (valve, based on FIG. 3): length 5 mm, outer diameter 6 mm, inner diameter 1 mm, made of butyl rubber, slit length 1.5 mm Examples 2

The same procedure as in Example 1 was carried out, except that in Example 1 described above, the fuel-storing vessel 12 and the housing box member 16 in the fuel-storing tank 10 were changed to the following constitutions.
Fuel-storing vessel 12: a polypropylene-made tube [light transmittance: 95%, oxygen gas permeability: 2500 cc·25 μm/m$^2$·24 hr·atm (25° C., 65% RH)] having a length of 100 mm, an outer diameter of 8 mm and an inner diameter of 6 mm in which the outer surface was coated with polyvinyl alcohol [oxygen gas permeability: 0.1 cc·25 μm/m$^2$·24 hr·atm (25° C., 65% RH)]. A film thickness of polyvinyl alcohol was 20 μm.
Housing box member 16: a vessel prepared by hermetically sealing with a polypropylene-made cover, both ends of a polypropylene-made tube [light transmittance: 95%, oxygen gas permeability: 2500 cc·25 μm/m$^2$·24 hr·atm (25° C., 65% RH)] having a length of 120 mm, an outer diameter of 14 mm and an inner diameter of 12 mm in which the outer surface was coated with polyvinyl alcohol [oxygen gas permeability: 0.1 cc·25 μm/m$^2$·24 hr·atm (25° C., 65% RH)]. A film thickness of polyvinyl alcohol was 20 μm.

Example 3

A fuel-storing tank having a constitution described below and based on FIG. 2 was prepared.
Constitution of fuel-storing tank 10:
Fuel-storing vessel 12: a coexttruded tube (light transmittance: 95%) having a length of 100 mm, an outer diameter of 8 mm and an inner diameter of 6 mm in which an inner layer comprised an ethylene vinyl alcohol copolymer resin [EVOH: oxygen gas permeability: 0.5 cc·25 μm/m$^2$·24 hr·atm (25° C., 65% RH)] and in which an outer layer comprised polypropylene [oxygen gas permeability: 2500 cc·25 μm/m$^2$·24 hr·atm (25° C., 65% RH)]. A film thickness of EVOH was 100 μm.
Liquid fuel F: 70 wt % methanol liquid (specific gravity: 0.872) 2 g filled
Composition of follower: the same as in Example 1
Housing box member 16: a vessel prepared by hermetically sealing with a polypropylene-made cover, both ends of a coexttruded tube (light transmittance: 95%) having a length of 120 mm, an outer diameter of 14 mm and an inner diameter of 12 mm in which an inner layer comprised an ethylene vinyl alcohol copolymer resin [EVOH: oxygen gas permeability: 0.5 cc·25 µm/m²·24 hr·atm (25° C., 65% RH)] and in which an outer layer comprised polypropylene [oxygen gas permeability: 2500 cc·25 µm/m²·24 hr·atm (25° C., 65% RH)]. A film thickness of EVOH was 100 µm.
Volume of space part 15: 10 ml
Pressurized gas G filled: nitrogen gas, 3000 hPa
Fuel discharge part (valve, based on FIG. 3): the same as in Example 1.

Examples 4

The same procedure as in Example 1 was carried out, except that in Example 1 described above, the fuel-storing vessel 12 and the housing box member 16 in the fuel-storing tank 10 were changed to the following constitutions.
Fuel-storing vessel 12: a tube [light transmittance: 95%, oxygen gas permeability: 100 cc·25 µm/m²·24 hr·atm (25° C., 65% RH)] prepared by winding a silica-deposited film (GL-N, manufactured by Toppan Printing Co., Ltd.) around a polypropylene tube having a length of 100 mm, an outer diameter of 8 mm and an inner diameter of 6 mm.
Housing box member 16: a vessel prepared by hermetically sealing with a polypropylene-made cover, both ends of a tube [light transmittance: 95%, oxygen gas permeability: 100 cc·25 µm/m²·24 hr·atm (25° C., 65% RH)] prepared by winding the silica-deposited film (GL-N, manufactured by Toppan Printing Co., Ltd.) around a polypropylene-made extruded tube [light transmittance: 95%, oxygen gas permeability: 2500 cc·25 µm/m²·24 hr·atm (25° C., 65% RH)] having a length of 120 mm, an outer diameter of 14 mm and an inner diameter of 12 mm.

Reference Example 1

In Example 1 described above, only a fuel-storing vessel 12 which was filled with the liquid fuel and the follower each used in Example 1 was used wherein the housing box member 16 was not used for the fuel-storing tank 10.
The fuel-storing tanks obtained in Examples 1 to 4 and Reference Example 1 were used to evaluate a discharge property and boiling resistance of the fuel by the following evaluation methods.
Evaluation method of a discharge property of the fuel:
A fuel supplying member (outer diameter: 1 mm and inner diameter: 0.7 mm, made of stainless steel) was inserted into a valve 13a to discharge the fuel at a flow velocity of 1 ml/min. A weight of the fuel discharged was measured, and it was set as a fuel discharge rate and evaluated according to the following evaluation criteria.
Evaluation criteria:
◯: the fuel discharge rate is 95% or more to 100%
Δ: the fuel discharge rate is 70% or more to less than 95%
X: the fuel discharge rate is less than 70%
Evaluation method of boiling resistance of the fuel:
The respective fuel tanks were left standing in a constant temperature bath of 60° C. for 30 minutes, and then the state of the fuel-storing vessel was visually evaluated according to the following evaluation criteria.
Evaluation criteria:

TABLE 1

| | Example | | | | |
|---|---|---|---|---|---|
| | 1 | 2 | 3 | 4 | |
| Discharge property of fuel | ◯ | ◯ | ◯ | ◯ | X |

TABLE 1-continued

| | Example | | | |
|---|---|---|---|---|
| | 1 | 2 | 3 | 4 |
| Boiling resistance of fuel | ◯ | ◯ | ◯ | Δ |

◯: no change is observed in the fuel-storing vessel and the fuel
Δ: bubbles are produced in the fuel in the fuel-storing vessel
X: the fuel boils, and the follower moved to allow the fuel to spill out As apparent from the results shown in Table 1 described above, it has been found that the fuel-storing tanks obtained in Examples 1 to 4 falling in the scope of the present invention are excellent in a discharge property of the fuel as compared with that obtained in Reference Example 1 and that they are excellent as well in boiling resistance of the fuel when left standing under high temperature environment. It has been found that in Examples 1 to 4, the liquid fuel is stably supplied and loss of the liquid fuel is not caused in storing and that the liquid fuel is less liable to boil and vaporize even when left standing under the environment of high temperature.

INDUSTRIAL APPLICABILITY

The liquid fuel reservoir of the present invention can be used for storing a fuel in a small-sized fuel cell which is suitably used as an electric power source for portable electronic appliances such as cellular phones, note type personal computers and PDA.

The invention claimed is:
1. A fuel cell equipped with a fuel cell main body, a liquid fuel-storing tank for storing a liquid fuel and a fuel-supplying member which has a penetrating structure and is connected with the liquid fuel-storing tank and which supplies the liquid fuel to the fuel cell main body, wherein the liquid fuel-storing tank is provided with
a liquid fuel reservoir comprising a cylindrical fuel-storing vessel for storing the liquid fuel,
a fuel discharge part which is provided at a lower part of the fuel-storing vessel and which has a fuel discharge valve and a gelatinous follower which is disposed at a rear end of the liquid fuel stored in the fuel-storing vessel and which moves as the liquid fuel is consumed,
a housing box member which encompasses at least a part of the liquid fuel reservoir via a space part in the periphery of the liquid fuel reservoir and whose rear end part is closed and
pressurized gas which is filled in the space part.
2. The fuel cell as described in claim 1, further comprising a gas tube and a pressurizing means for pressurizing the pressurized gas in the space part through the gas tube.
3. The fuel cell as described in claim 1, wherein the fuel-storing vessel and the housing box member comprise a gas non-permeable material.
4. The fuel cell as described in claim 3, wherein a surface free energy of the fuel-storing vessel has been controlled by a method in which a wall surface brought into contact with the liquid fuel in the fuel-storing vessel is subjected to water repellent film-forming treatment with coating a water repellent agent of silicone base or a fluorine base to a lower value than a surface free energy of the liquid fuel on at least a wall face which is brought into contact with the liquid fuel.
5. The fuel cell as described in claim 3, wherein the fuel-storing vessel and the housing box member are formed of a material having a light transmittance of 50% or more.

6. The fuel cell as described in claim 3, wherein the fuel-storing vessel and the housing box member are formed of a material having an oxygen gas permeability of 100 cc/m$^2$·24 hr (at 1 atm, 25° C., 65% RH) through the material of 25 μm thick or less.

7. The fuel cell as described in claim 3, wherein the gas non-permeable material comprises a gas non-permeable resin of a single kind or two or more kinds selected from polyvinyl alcohol, ethylene•vinyl alcohol copolymer resins, polyacrylonitrile, nylon, cellophane, polyethylene terephthalate, polycarbonate, polystyrene, polyvinylidene chloride and polyvinyl chloride.

8. The fuel cell as described in claim 1, wherein the fuel-storing vessel and the housing box member assume a multilayer structure in which the resin layer comprises two or more layers, and at least one layer of the resin layers comprises a gas non-permeable resin.

9. The fuel cell as described in claim 8, wherein the multilayer structure of the fuel-storing vessel and the housing box member comprises a coated gas non-permeable resin.

10. The fuel cell as described in claim 8, wherein the gas non-permeable resin layer has a thickness of 10 to 2000 μm.

11. The fuel cell as described in claim 1, wherein the fuel-storing vessel and the housing box member are covered with a gas non-permeable thin film member.

12. The fuel cell as described in claim 11, wherein the gas non-permeable thin film member is at least one selected from a metal foil, a metal oxide-deposit and a diamond-like carbon coating substance.

13. The fuel cell as described in claim 1, wherein a releasing part for letting out at least a portion of the pressurized gas filled in the space part to the outside of the liquid fuel-storing tank when the liquid fuel-storing tank is exposed to high temperature is formed at least in a part of the housing box member.

14. The fuel cell as described in claim 13, wherein the housing box member is formed by joining members of at least two or more parts, and at least one joint between parts of the housing box is set to be weaker than a joint between the fuel-storing vessel and the fuel discharge part.

15. The fuel cell as described in claim 1, wherein the liquid fuel-storing tank comprises a cartridge structure detachably connected with the fuel cell main body.

16. The fuel cell as described in claim 1, wherein the fuel cell main body assumes a structure in which plural unit cells each of which is formed by constructing an electrolyte layer on the outer surface of a fuel electrode body and constructing an air electrode layer on the outer surface of the electrolyte layer are joined and in which the fuel-supplying member connected with the liquid fuel-storing tank is coupled with the unit cells to supply the liquid fuel.

* * * * *